United States Patent
Lin et al.

(10) Patent No.: US 6,823,622 B2
(45) Date of Patent: Nov. 30, 2004

(54) MICROBE-MEDIATED METHOD AND APPARATUS FOR ATTRACTING MOSQUITOES

(75) Inventors: Hao-Jan Lin, Taipei (TW); Kuo-Tung Huang, Taipei (TW)

(73) Assignee: BioWare Technology Co., Ltd., Taipei Hsien (TW)

( * ) Notice: Subject to any disclaimer, the term of this patent is extended or adjusted under 35 U.S.C. 154(b) by 57 days.

(21) Appl. No.: 10/198,900

(22) Filed: Jul. 19, 2002

(65) Prior Publication Data

US 2003/0005619 A1 Jan. 9, 2003

Related U.S. Application Data

(63) Continuation-in-part of application No. 10/005,559, filed on Nov. 8, 2001, now Pat. No. 6,508,032, and a continuation-in-part of application No. 09/749,353, filed on Dec. 27, 2000, now Pat. No. 6,425,202.

(51) Int. Cl.$^7$ .............................................. A01M 1/20
(52) U.S. Cl. .......................................... 43/122; 43/107
(58) Field of Search .......................... 43/107, 122, 112, 43/139

(56) References Cited

U.S. PATENT DOCUMENTS

| | | | | |
|---|---|---|---|---|
| 2,113,409 A | * | 4/1938 | Niemeyer ................... | 43/113 |
| 2,193,492 A | * | 3/1940 | Richardson ................. | 43/107 |
| 3,796,001 A | * | 3/1974 | Jackson ...................... | 43/113 |
| 4,244,135 A | * | 1/1981 | Harwoods .................. | 43/122 |
| 4,694,604 A | * | 9/1987 | Mitchell ..................... | 43/114 |
| 5,189,830 A | * | 3/1993 | Montemurro ............... | 43/121 |
| 5,274,949 A | * | 1/1994 | Beaton ........................ | 43/113 |
| 5,339,563 A | * | 8/1994 | Job ............................. | 43/122 |
| 5,452,540 A | * | 9/1995 | Dowd .......................... | 43/107 |
| 6,134,826 A | * | 10/2000 | Mah ............................. | 43/112 |

FOREIGN PATENT DOCUMENTS

WO    99/26471    *    6/1999    .................. 43/114

* cited by examiner

*Primary Examiner*—Kurt Rowan
(74) *Attorney, Agent, or Firm*—J.C. Patents

(57) ABSTRACT

The present invention provides a method and apparatus for generating the mosquito bait as well as stimulating the human body's surface temperature and emanated odor. A well-controlled heating assembly can be used to generate a suitable thermal gradient for simulating body temperature and evaporating the bait. The bait comprises at least the bacterial fermentation product. The bait is not poisonous to human beings and contains mosquito attractants made from natural products of fermentation or decomposition. The apparatus according to this invention comprises at least an upper compartment for trapping mosquitoes and a bottom compartment including the bait and the beating assembly. This invention can also combine with electrocution grids or insecticide webs to destroy attracted mosquitoes.

22 Claims, 3 Drawing Sheets

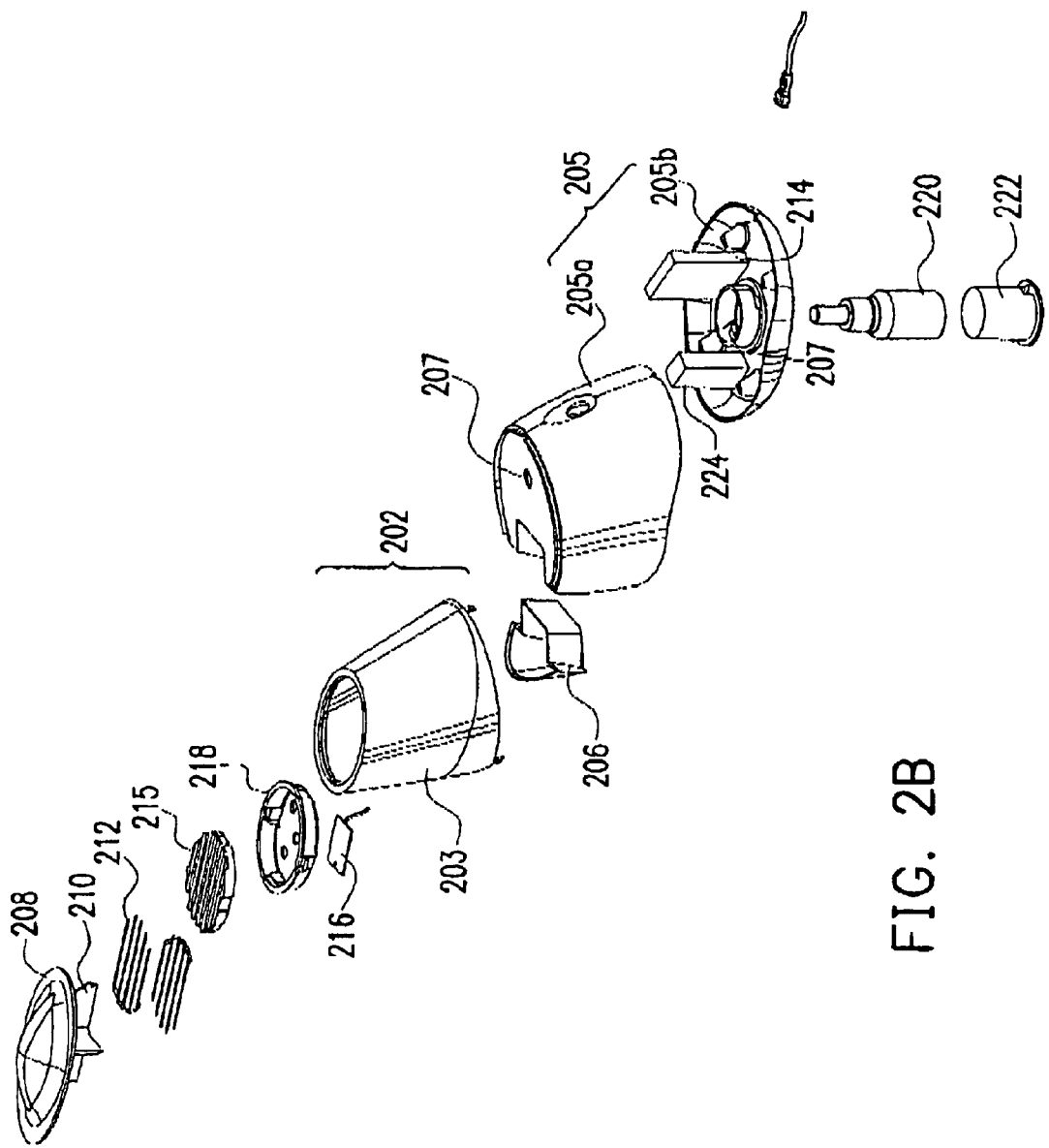

MICROBE-MEDIATED METHOD AND APPARATUS FOR ATTRACTING MOSQUITOES

CROSS-REFERENCE TO RELATED APPLICATION

This application is a continuation-in-part of prior U.S. application Ser. No. 09/749,353, filed Dec. 27, 2000 now U.S. Pat. No. 6,425,202, and U.S. Ser. No. 10/005,559, filed Nov. 8, 2001 now U.S. Pat. No. 6,508,032.

BACKGROUND OF THE INVENTION

1. Field of Invention

The present invention relates to means for insect control. More particularly, the present invention relates to a microbe-mediated method of attracting mosquitoes for control purposes or for destroying mosquitoes.

2. Description of Related Art

Insect control has been in great demand throughout human history. It is necessary to control harmful insects like mosquitoes, to prevent the spread of disease, such as malaria and yellow fever. Public health authorities everywhere have expended intense effort on eliminating mosquito-related disease; however, this effort has not been wholly successful, largely because of the difficulty of eliminating mosquitoes. In addition to eliminating mosquito-related disease, another reason for eliminating mosquitoes is abatement of the nuisance caused by mosquito bites. Therefore, there has been a perennial call for means of effective mosquito control, including means to attract, capture, or destroy active mosquitoes.

Female mosquitoes seek a human host from which they obtain a blood meal for egg development. Mosquitoes locate hosts through a combination of chemicals characteristic of the hosts. It is believed that the volatiles emanating from the human host are responsible for the attractant. These volatiles contain 300–400 compounds and originate from either the secretions of skin glands, or the decomposition of the skin microflora, or both. The mosquitoes use their olfactory structures to detect the attractant from as far away as 90 meters Current methods of control only attack the mosquito population as a whole by chemical means or seek to remove their breeding sites. These methods are cumbersome, labor-intensive and often disruptive, in that they may introduce dangerous amounts of toxic chemicals into the environment. Some other attempts have been made to construct mosquito traps. For trapping mosquitoes, light, warmth, carbon dioxide octenol, water vapor and lactic acid have all been used as attractants.

SUMMARY OF THE INVENTION

The invention provides a method for controlling mosquitoes by attracting mosquitoes using bacterial decomposition products as the attractants for blood-feeding female mosquitoes and for non-host seeking mosquitoes respectively. This invention has combined heat and simulating attractants to achieve a highly efficient attraction. The invention also comprises methods for trapping mosquitoes for control purposes or for destroying mosquitoes after attracting them.

Another objective of the present invention is to provide a method and apparatus for generating the mosquito bait, as well as simulating the human body's surface temperature and emanated odor. A well-controlled heating assembly can be used to generate a suitable thermal gradient for enhancing the release of the bait. The bait comprises at least the bacterial fermentation products. The bait is not poisonous to human beings and contains mosquito attractants made from natural products of bacterial fermentation or incubation. The bacterial fermentation or incubation is further processed and fertilized to obtain the final bacterial fermentation product as the bait. This invention can also combine with electrocution grids or insecticide webs to destroy gathered mosquitoes.

As embodied and broadly described herein, the present invention provides a portable mosquito controlling system for trapping mosquitoes, for use indoors or outdoors, the system comprising an upper compartment including a plurality of channels for admitting and trapping mosquitoes; a bottom compartment connected to the upper compartment by a snap-in clip mechanism. The mosquito controlling system further comprises a fixture for holding a cassette (or bottle) containing at least a bacterial fermentation product and controllable heating means for generating heat.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2B is a partially exploded perspective view of the apparatus shown in FIG. 2A

DESCRIPTION OF THE PREFERRED EMBODIMENTS

Figure 1:
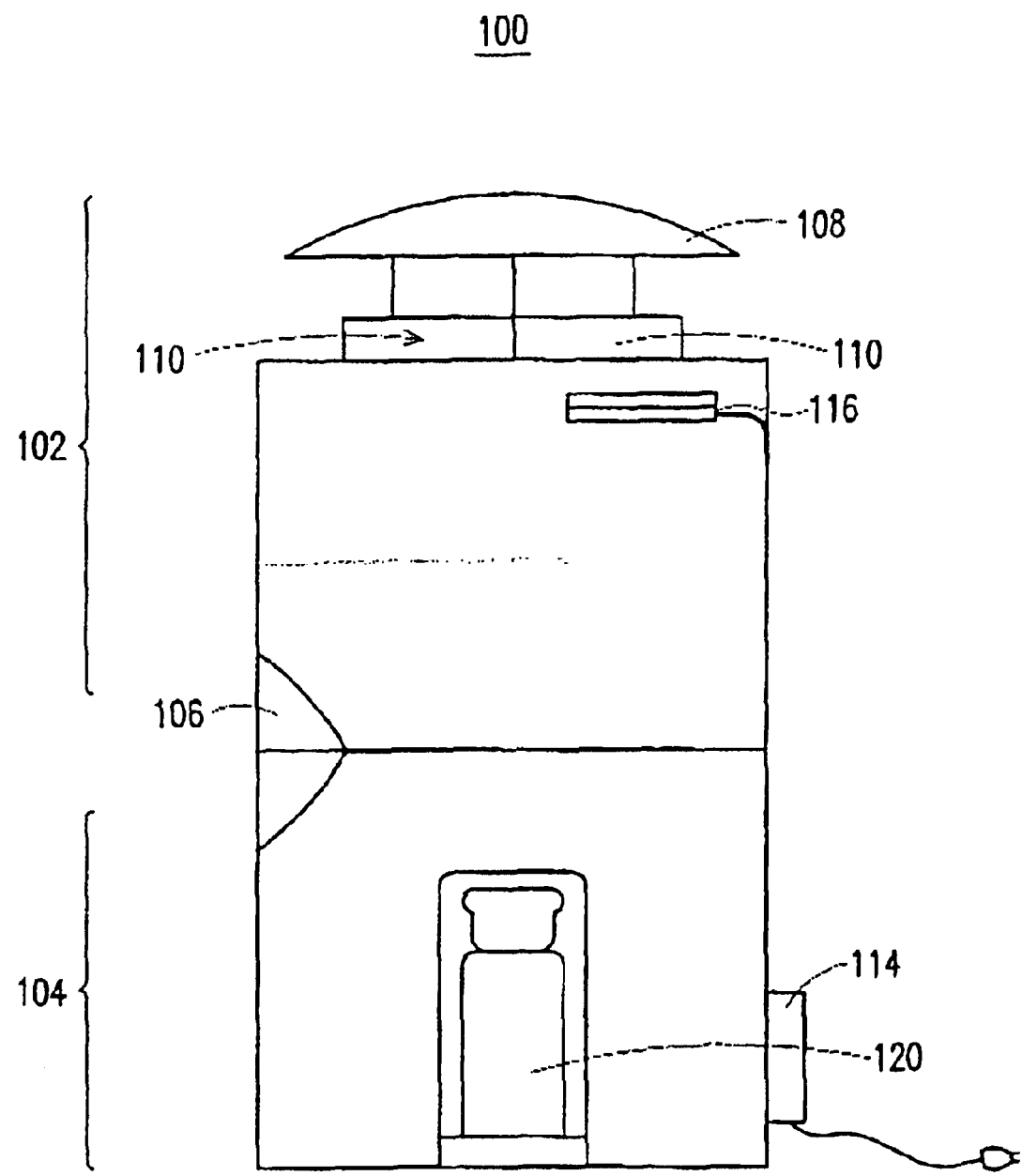
FIG. 1 is a schematic view of an apparatus according to one preferred embodiment of the present invention.

Some Coryneform bacteria, existing in human sweat, are known to produce methanethiols that emanate as both cheese and foot odor. The microbes may be responsible for producing human odors from human perspiration. Evidence for direct microbial involvement in producing the volatile attractants in human hosts has been demonstrated by showing that incubation of sweat enhances its attraction. Therefore, it is very useful to identify these microbes and use these microbes for simulating human odors, as a means for attracting the haematophagous mosquitoes.

In this invention, the mosquito attractants include at least a human odor simulator simulating human host volatiles. The human odor simulator is provided by specific bacterial decomposition or fermentation products.

Experimental Data:

Some experiments were applied to mosquitoes, described as following:

Mosquitoes The *Aedes aegypti* (Ping-Tung Taiwan strain or UGAL strain) were maintained and assayed at 23–25° C., 60–80% relative humidity, and 12 hrs light/12 hrs dark. Adults were kept in 30 $cm^3$ gauze-covered cages and fed with a 10% (v/v) sugar solution. In the bioassay 30 of the 4–8 day-old females that had not received a blood meal were released into a dual-port olfactometer. The olfactometer consisted of a flight chamber (1.6 m×0.6 m×0.6 m) in which mosquitoes were released. Air pumped from the room source was filtered by charcoal, passed through two bottles of distilled water, and one of the two ports (5 cm diameter, 30 cm apart), and then released into the flight chamber. The odor source was placed in the port, where the temperature was kept at 30° C. by a water circulation system, while the room temperature was maintained at 23–25° C. The observation time of the bioassay was 15 minutes after releasing mosquitoes. All parts of the olfactometer were cleaned with 75% alcohol and blow with strong fans for 20 minutes between test series. In addition, to counteract the effect of any biased directional response of unknown origin, the positions of the treatment and control were alternated between ports after each test.

Bacteria Strains of two Coryneform bacteria, *Brevibacterium epidermidis* (BE) and *B. linens* (BL), purchased from Deutsche Sammlung von Mikrooranismen and Zellkulturen GmbH, Braunschweig, Germany and Food Industry Research & Development Institute, Hsinchu, Taiwan, ROC, respectively, were used for bioassay. The bacteria were grown in three different mediums TSB, MB and NB. The ingredients of the three mediums are listed as following: TSB (15 grams of tryptone+5 grams of soytone+5 grams of NaCl/liter, pH 7.3), MB (50 grams of milk powder+2.5 grams of peptone/liter, pH 7.2) and NB (5 grams of peptone+1.5 grams of beef extract+15 grams of yeast extract+5 grams of NaCl/liter, pH 7.4) at 30° C., 200 rpm for two days.

In order to screen the different combinations of bacteria and medium for the highest efficiency of mosquito attraction, 4 ml of the 2-day-old bacterial cultures from different combinations were tested in the olfactometer.

As shown, in Table 1, most Corynebacterial strains grown in any of these three mediums can attract mosquitoes, except for strain BE9585 that did not show attraction. Among them, strain BE9586 is the only one to show attraction with all three growing mediums, of which that cultured with the NB medium had the highest attraction percentage. In general, the attraction efficiency was not higher than 30% in the absence of the heating device.

TABLE 1

Bacterial cultures attracting adult female mosquitoes

| Strains | TSB | MB | NB |
|---------|-----|-----|-----|
| BE20660 | +[a] | − | − |
| BE9585 | − | − | − |
| BE9586 | + | + | +++ |
| BE20659 | NA[b] | 1 | NA |
| BL20158 | − | ++ | NA |
| BL20425 | − | + | NA |
| BL20426 | + | + | + |

[a]Degree of the mosquito attraction, approximately measured by percentage."−" no attraction, "+" = 10%, "++" = 20%, "+++" = 30%
[b]Not available In order to further identify the attraction of strain BE9586 grown in the NB medium, the supernatant obtained from centrifugation of the bacterial culture was assayed in the olfactometer. Up to 86.7% of adult female mosquitoes were attracted toward the supernatant of the bacterial culture in an experiment. This percentage of attraction was approximately 20% higher than NB medium alone and 25% higher than blank solution without the odor source, such as water. It suggests that volatiles emanating from decomposition of the bacterial culture can exclusively attract adult female mosquitoes. In this assay, the heating itself showed 61.7% attraction, higher than previous non-heated odor sources. Possibly, the heating device provides heat stimulating human body heat so as to attract mosquitoes. In addition, the heating device may also function for better evaporation of the bacterial decomposition.

Bacterial fermentation products At first, autoclave the bacterial growth medium NB [0.5% (v/w) peptone +0.15% (v/w) beef extract +0.15% (v/w) yeast extract +5% NaCl] under 121° C., 1.5 atmosphere for 20 minutes. Next, transfer bacterial inoculum (O.T). 1.9, about $10^9$ cells/cc) into the above sterilized growth medium in a 1:100 ratio (v/v) of inoculum to medium. Blend aliquots in a 2000 liter fermentor to grow bacteria for two days with the following parameters: initial pH 5.5, final pH 8.5, initial O.D. void, final O.D, 1.9 at the wave length of 600 nm, under a constant incubation temperature of 30° C., with air flow 0.2 liter/minutes and blend rotation of 100 rpm. Continuously centrifuge (5000× g for 10 minutes) to remove most of the bacterial cells after the fermentation (inclination). The obtained supernatant is autoclave under 121° C., 1.5 atmosphere for 20 minutes for serialization. The sterilized supernatant is diluted up to three times with sterilized distilled water and stored in 10% alcohol (v/w) as the final fermentation product.

While the above descriptions only provide an exemplary embodiment for fabricating bacterial fermentation products, other bacterial growth medium can also be used for fermentation. In addition, the final bacterial fermentation product should have no biological hazard toward human beings of the ecological environment, since the bacterial fermentation has been processed and sterilized.

A standard extraction procedure with different non-polar solvents was performed to identify the major ingredient of the attractant. Through various non-polar solvents, the obtained extracts were vacuumed to dry by rotary vacuum evaporator and then re-dissolved in 10% alcohol water solution. The aforementioned sterilized supernatant is tested here as the non-extracted attractant. As shown in Table 2, extracts with three solvents of different polarity could retain most of the attraction when compared with the non-extracted attractant. Among these solvents n-Hexane provides the highest attraction rate toward mosquitoes, while n-Hexane, having a low polarity. index of 0 1, could almost be considered as a non-polar solvent. The results indicate that non-polar volatiles dissolved in non-polar solvents could be metabolites of the bacterial cultures involved in the attraction. The solvents alone do not have attraction for mosquitoes. As encompassed within the scope of the present invention, the bacterial fermentation product can be produced from bacterial cultures using various culture mediums. The obtained supernatant is processed and sterilized, while subsequent extraction with non-polar solvents is optional.

TABLE 2

| SOLVENT | POLARITY INDEX | TRAPPED MOSQUITOES (%)* |
|---------|----------------|-------------------------|
| n-Hexane | 0.1 | 61.3 |
| Dichloromethane | 3.1 | 52.7 |
| Ether | 2.8 | 48.7 |
| non-extracted attractant | — | 64.7 |
| Water alone | — | 37.3 |

*Total 30 female mosquitoes were released into the tested chamber. Only one set of the data from three independent trials was shown.

FIG. 1 is a schematic view of an apparatus according to one preferred embodiment of the present invention. Referring to FIG. 1, the apparatus 100 is divided into an upper compartment 102 and a bottom compartment 104, connected by a snap-in clip mechanism. Alternatively, the upper and the bottom compartments can be connected by other well-known fixation mechanisms, such as screws or bolts. A shield 108 is connected to the top of the upper chamber 102 with a supporting means, such as a supporting stock with an extension walls for leading mosquitoes into passing channels. The shield 108 is separated from the upper compartment 102 by a distance of about 1–2 cm. Preferably, a top (outer) surface of the shield 108 is tinged in bright colors, for not distracting mosquitoes. On the other hand, a inner surface of the shield 108 and the passing, channels 110 are preferably colored in dark colors for attracting mosquitoes. Under the shield 108, the top of the upper compartment includes a plurality of passing channels 110 that open inward to the internal space of the upper chamber 102. The passing channels 110 have openings large enough for mosquitoes to pass through, while the channels 110 open inward to prevent the escape of incoming mosquitoes. The upper compartment 102 includes a mosquito-destroying means, such as all electric grid or a sticky pesticide web. Preferably, an electric grid is used to destroy the attracted mosquitoes. A collecting drawer 106 is arranged between the upper compartment 102 and the bottom compartment 104, for collecting destroyed mosquitoes or fragments.

Referring to FIG. 1, the bottom compartment 104 includes an adjustable heating assembly 114, comprising a temperature-control means and/or a time-control means. The time-control means can set up an application time based on the user's schedule. The temperature-control means can generate heat to a specific (set-up) temperature and maintain the temperature, and comprises, for example, at least a metallic heater 116 that is controlled by a logic circuit. The metallic heater 116 is preferably placed within the upper compartment 102 for enhancing its effects in attracting mosquitoes. The adjustable heating assembly 114 can generate a regulated thermal gradient for simulating human body heat and enhancing evaporation of the bacterial decomposition products. A container 120 is placed inside the bottom compartment 104 and on the bottom of the bottom compartment 104. The container 120 comprises host odor simulators, for example, bacterial decomposition (fermentation) products. The container 120 can be designed to be a bottle or a cassette, depending on the state of the bacterial fermentation products.

After incubating specific microorganisms (bacteria) with cultivating mediums, bacteria can generate metabolic products or decompose the cultivating medium so as to produce bacterial decomposition or fermentation products. Preferably, Corynebacterial strains and cultivating conditions used in previous experiments are used. For example, strain BE9586 grown in the NB medium [5 grams of peptone+1.5 grams of beef extract+15 grains of yeast extract+5 grams of NaCl/liter] is used to provide bacterial decomposition products. The obtained bacterial products can be modified as jelly-like gels or various solutions depending on the requirements.

Experiments performed by the inventors for the effect to heat combined with odor simulators on the mosquito species *Aedes aegypti* showed that bacterial decomposition along with heat evaporation could attract 60% of the mosquitoes. Using bacterial decomposition as the mosquito bait attracts more mosquitoes in a certain period when compared with other baits, probably due to the dominant influence of odors in host-seeking behavior of mosquitoes. Nevertheless, water or culture medium can be considered as mosquito baits, since they showed some attraction toward mosquitoes in previous experiments.

Figure 2A:
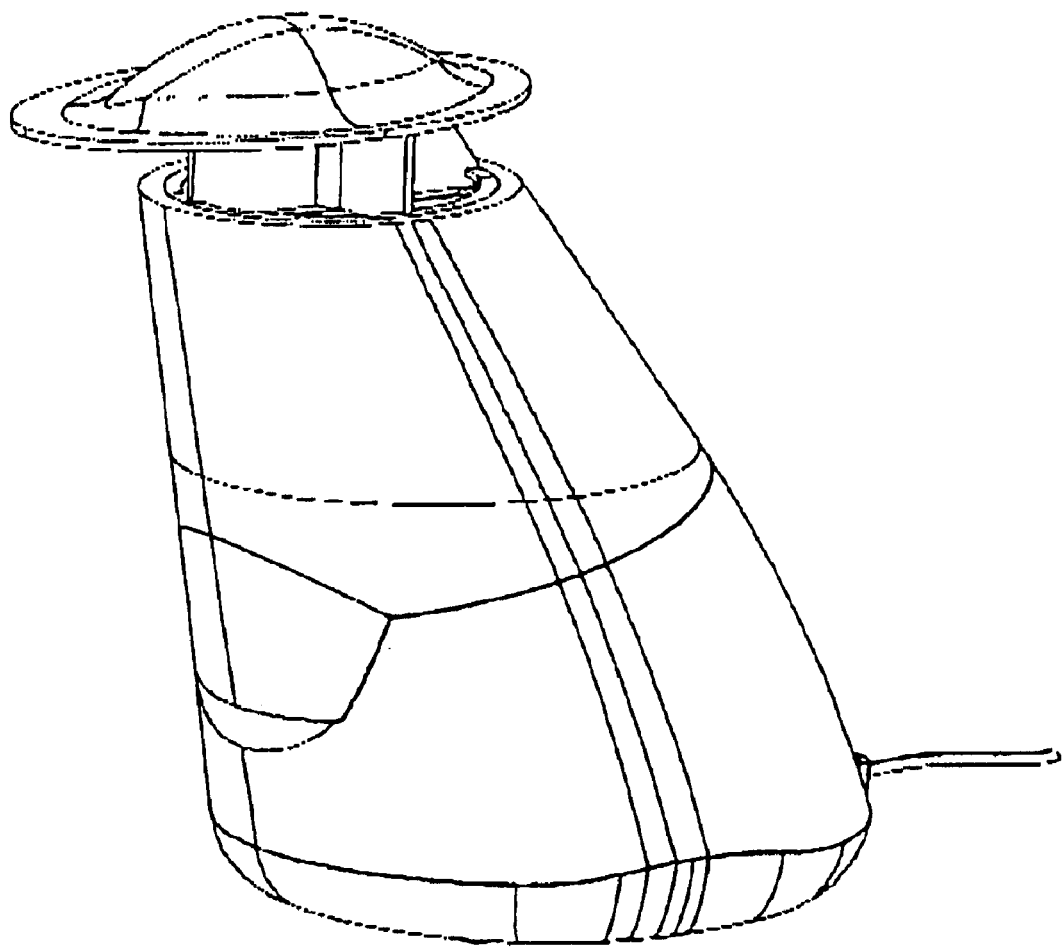
FIG. 2A is a perspective view of an apparatus according to one preferred embodiment of the present invention.

FIG. 2A is a perspective view of an apparatus according to one preferred embodiment of the present invention, while FIG. 2B is an exploded perspective view of the apparatus shown in FIG. 2A.

Referring to FIG. 2A, an apparatus 200 is shown with an upper compartment 202, a bottom compartment 204, a collecting drawer 206 and a shield 208.

Referring now to FIG. 2B, the apparatus 200 is shown in an exploded perspective view to further describe assembly details of the apparatus. The upper compartment 202 is defined by an upper casing 203 that is integral and hollow. After the assembly is complete, the upper compartment 202 includes an electric grid 212, a protection grid 215, a heater 216 and a plate 218 mounting on the top of the upper compartment 202. The plate 218 supports and holds the electric grid 212 and the protection grid 215, while the heater 216 is fixed to the opposite side of the supporting plate 218. The collecting drawer 206 can gather dropped mosquitoes from the upper compartment 202. Alternatively, instead of using electric grid, a collecting web 213 including a sticky material 217a to trap mosquitoes or insecticides 217b for killing mosquitoes may be used.

The bottom compartment 204 is defined by a two-piece casing 205 that consists of a lower casing 205a and a base 205b. The lower casing 205a is hallow and, for example, shaped as a canopy or upside-down cup, while a ventilation hole 207 is arranged on the top of the lower casing. The ventilation hole 207 can help ventilating air between the upper and bottom compartments, thus enhancing emanating the attractant. The base 205b is attached to the lower casing 205a by, for example, screws or bolts. Alternatively, the housing of the bottom compartment can be an integral piece. A container bottle 220 is mounted on the center of a fixture 222. The fixture 222 is coupled to the base 205b, so that the container 220 is located inside the bottom compartment 204. The fixture 222 together with the locked container 220 are removable (replaceable) and can be dismantled from the base 205b through a central hole of the base 205b, so that the container 220 can be refilled or replaced.

Referring to FIG. 2B, the bottom compartment 204 includes an adjustable heating assembly 214, comprising a temperature-control means and/or a time-control means. The temperature-control means, including at least a heater 216, can generate heat and maintains a specific temperature range, for example, the human body temperature range. The heater 216 is preferably placed within the upper compartment 202 for enhancing its effects in attracting mosquitoes. The adjustable heating assembly 214 can generate a regulated thermal gradient for simulating human body heat and enhancing evaporation of the bacterial decomposition products. In addition, a power source 224 is included within the bottom compartment 204 for providing electric power for the electric grid 212 and/or the heating assembly 214. The power source 224 is either powered through batteries or coupled to a DC power source by a plug.

An apparatus of the aforementioned design has been applied in a space of $3.5 \times 35 \times 3$ m$^3$ for testing effectiveness. The mosquito-killing percentage is as high as 64.0%, with total 60 female mosquitoes released into the tested space.

It will be apparent to those, killed in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable mosquito controlling system in for trapping mosquitoes, for use indoors or outdoors, comprising:
   an upper compartment including a plurality of channels, wherein the channels are opened inwardly for admitting and trapping mosquitoes;
   a bottom compartment, wherein the bottom compartment is connect to the upper compartment;
   a drawer between the upper compartment and the bottom compartment;
   a fixture for holding a container, wherein the fixture and the container are placed within the bottom compartment the container contains at least a mosquito bait, where the mosquito bait comprises at least a bacterial fermentation product; and
   a controllable heating means in the bottom compartment for generating heat.

2. The system as claimed in claim 1, wherein the system further comprises at least a heater controlled by a logic circuit, and wherein the heater is placed within the upper compartment for generating heat.

3. The system as claimed in claim 1, wherein an electric grid supported by a plate is mounted on a top of the upper compartment.

4. The system as claimed in claim 3, further comprising a power source in the bottom compartment for supplying power.

5. The system as claimed in claim 3, further comprising a protection grid between the electric grid and the plate.

6. The system as claimed in claim 1, further comprising a trapping web mounted a top of the upper compartment.

7. The system as claimed in claim 6, wherein the trapping web further comprises a sticky material for trapping mosquitoes.

8. The system as claimed in claim 6, wherein the trapping web further comprises an insecticide for killing mosquitoes.

9. The system as claimed in claim 1, wherein the bacterial fermentation product comprises a sterilized supernatant of a bacteria fermentation.

10. The system as claimed in claim 9, wherein a strain of Coryneform bacteria is used in the bacteria fermentation for producing the bacterial fermentation product.

11. The system as claimed in claim 9, wherein the bacteria fermentation product comprises a non-polar solvent extract of the sterilized supernatant of the bacteria fermentation.

12. A method of controlling mosquitoes by trapping the mosquitoes, wherein the method comprises:
    providing a mosquito trap, wherein the mosquito trap comprises at least means for admitting mosquitoes and means for trapping mosquitoes;
    preparing a mosquito bait for attracting mosquitoes, wherein the mosquito bait comprises at least a bacterial fermentation product;
    placing the mosquito bait within the mosquito trap, so that mosquitoes attracted by the mosquito bait can be trapped by the mosquito trap; and
    providing heat for the mosquito trap, wherein the heat can help emanation of odors from the mosquito bait and simulate a body temperature for attracting mosquitoes.

13. The method as claimed in claim 12, wherein the bacterial fermentation product comprises a sterilized supernatant of a bacteria fermentation.

14. The method as claimed in claim 13, wherein a strain of Coryneform bacteria is used in the bacteria fermentation for producing the bacterial fermentation product.

15. The method as claimed in claim 13, wherein the bacteria fermentation product comprises a non-polar solvent extract of the sterilized supernatant of the bacteria fermentation.

16. The method as claimed in claim 12, wherein the mosquito trap further comprises using a sticky material for trapping mosquitoes.

17. The method as claimed in claim 12, wherein the mosquito trap further comprises using an insecticide for killing mosquitoes.

18. The method as claimed in claim 12, wherein the mosquito trap further comprises using an electric grid for killing mosquitoes.

19. A method of attracting mosquitoes, wherein the method comprises:
    preparing a mosquito bait for attracting mosquitoes, wherein the mosquito bait comprises at least a bacterial fermentation product, and
    providing heat for evaporating the mosquito bait to emanate mosquito attractants, wherein the mosquito attractants include at least a combination of odors from the bacterial fermentation product that simulates a human being, and wherein the provided heat simulates a body temperature and acts as an attractant.

20. The method as claimed in claim 19, wherein the bacterial fermentation product comprises a sterilized supernatant of a bacteria fermentation.

21. The system as claimed in claim 20, wherein a strain of Coryneform bacteria is used in the bacteria fermentation for producing the bacterial fermentation product.

22. The system as claimed in claim 20, wherein the bacteria fermentation product comprises a non-polar solvent extract of the sterilized supernatant of the bacteria fermentation.

* * * * *